United States Patent

[11] 3,614,061

| [72] | Inventor | John R. Fitzpatrick<br>Tulsa, Okla. |
|---|---|---|
| [21] | Appl. No. | 803,622 |
| [22] | Filed | Mar. 3, 1969 |
| [45] | Patented | Oct. 19, 1971 |
| [73] | Assignee | Charles Wheatley Company<br>Tulsa, Okla. |

[54] CERAMIC GATE VALVE
7 Claims, 4 Drawing Figs.

[52] U.S. Cl. ................................................ 251/327,
251/328, 251/368
[51] Int. Cl. ................................................ F16k 3/02,
F16k 3/314
[50] Field of Search ........................................ 251/327,
328, 368

[56] References Cited
UNITED STATES PATENTS
828,280  8/1906  Firey ........................ 251/368 X

| 3,331,396 | 7/1967 | Willis | 251/368 X |
| 3,379,405 | 4/1968 | Natho | 251/327 X |
| 3,457,950 | 7/1969 | Over | 251/327 X |
| 3,307,826 | 3/1967 | Lowrey | 251/327 |

*Primary Examiner*—Arnold Rosenthal
*Attorney*—William S. Dorman

ABSTRACT: A gate valve having the gate member and valve seating portions constructed from a ceramic material for hardness and density qualities and extremely high resistance to chemical action and resistance to high temperatures. The valve gate member is particularly designed and constructed to maintain the ceramic material under compression at all times to assure excessive strength for the valve. In addition, the coaction between the ceramic gate and ceramic-seating members provides an optimum coefficient of static friction during operation of the valve for facilitating opening thereof.

JOHN R. FITZPATRICK
INVENTOR

BY
William S. Dorman
ATTORNEY

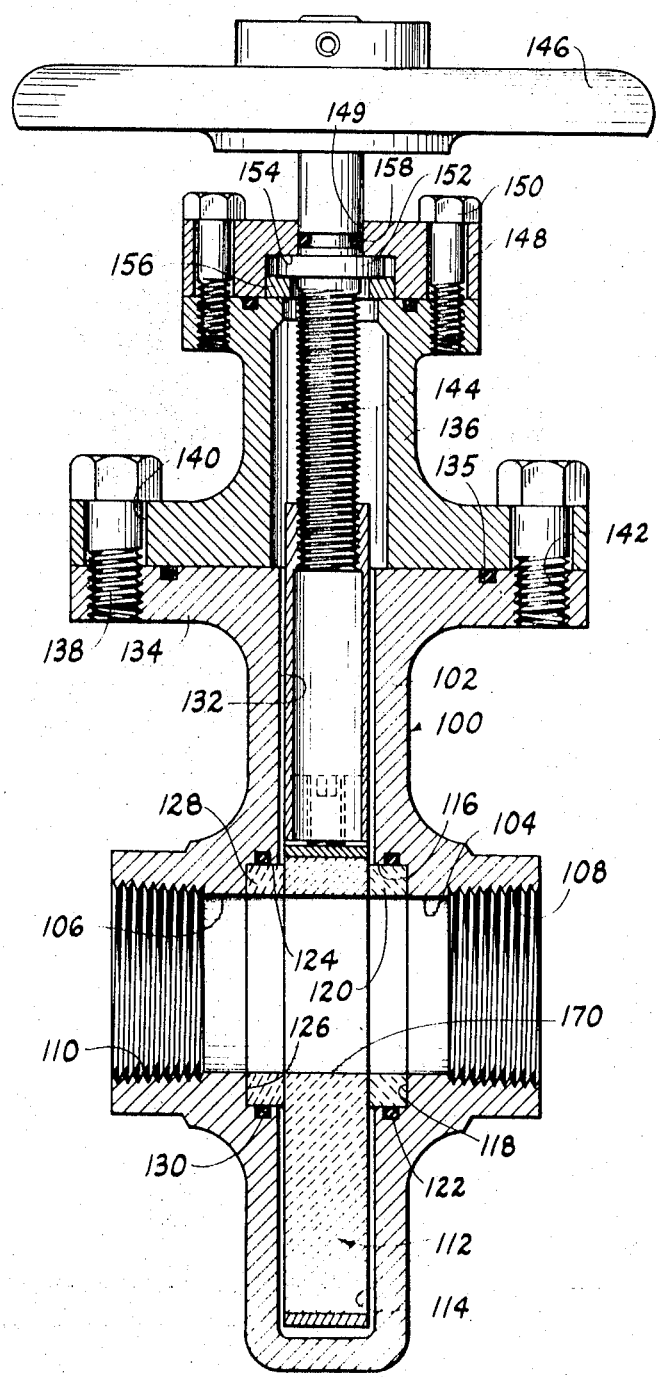

CERAMIC GATE VALVE

This invention relates to improvements in valves and more particularly, but not by way of limitation, to a gate valve particularly constructed for great corrosion and erosion resistance qualities.

Gate valves are frequently interposed in flow lines or distribution pipelines wherein gas, oil or any suitable fluid is transported therethrough for delivery to a consumer. Normally the distribution line is utilized for delivery of the fluid to a plurality of consumers and the gate valves are interposed in the line at predetermined positions for stopping the flow or diverting the flow of the products when the custody of the product is changed. In addition, there are many applications for gate valves wherein highly corrosive materials are being handled, and in other instances there are great erosion problems encountered. For example, in a blowdown operation in a pipeline, or the like, and particularly in natural gaslines, the line is evacuated by opening a valve and releasing the fluid pressure to the atmosphere. In high-pressure operation, such as 1,000 p.s.i., the gas flows out the open valve at extremely high velocities, and the particles or debris in the line are blown out with the gas stream. The effect of the grit, and other particles, is similar to a sand-blasting operation on the interior portions of the valve. As a result, blowdown valves become worn beyond use very quickly and must be discarded or thrown away. Three or four blowdown operations are about the most that is possible with a single valve before the valve must be replaced. In addition, applications of gate valves wherein salt water conditions exist create great corrosion and erosion problems for the valves.

The present invention contemplates a novel gate valve particularly designed and constructed for overcoming the foregoing disadvantages. The gate member and valve seating portions of the valve are constructed from a ceramic material having extremely high-compressive strength and hardness. The valve is a full opening valve with the gate member being constructed in a manner as to maintain the ceramic material under compression at all times for providing the great strength for the gate member. In addition, the bore in the gate member is so disposed therein as to further assure a maintaining of compression forces on the gate member during both the opening and closing thereof. The coefficient of static friction between the gate member and seating portions is at an optimum which greatly facilitates opening of the valve. Whereas the particular valve disclosed herein is a gate valve, it is to be understood that the ceramic material may also be used in ball valves, plug valves, and the like, for overcoming the above disadvantages and providing the improved results possible with the hard, strong, resistant material.

It is an important object of this invention to provide a novel gate valve which is highly corrosion and erosion resistant for greatly prolonging the life of the valve.

Another object of this invention is to provide a novel gate valve wherein an optimum static friction is provided between the gate member and seating portions for facilitating the opening of the valve.

It is another object of this invention to provide a novel gate valve wherein the gate member is constructed of a ceramic material under compression for providing great strength therefor.

Other and further objects and advantageous features of the present invention will hereinafter more fully appear in connection with a detailed description of the drawings in which:

FIG. 2 is a sectional elevational view of a modified form of a gate valve embodying the invention.

FIG. 3 is a front elevational view, partly in section, of the gate member utilized in the valve depicted in FIG. 1.

FIG. 4 is a front elevational view, partly in section, of the gate member utilized in the valve depicted in FIG. 2.

Figure 1:
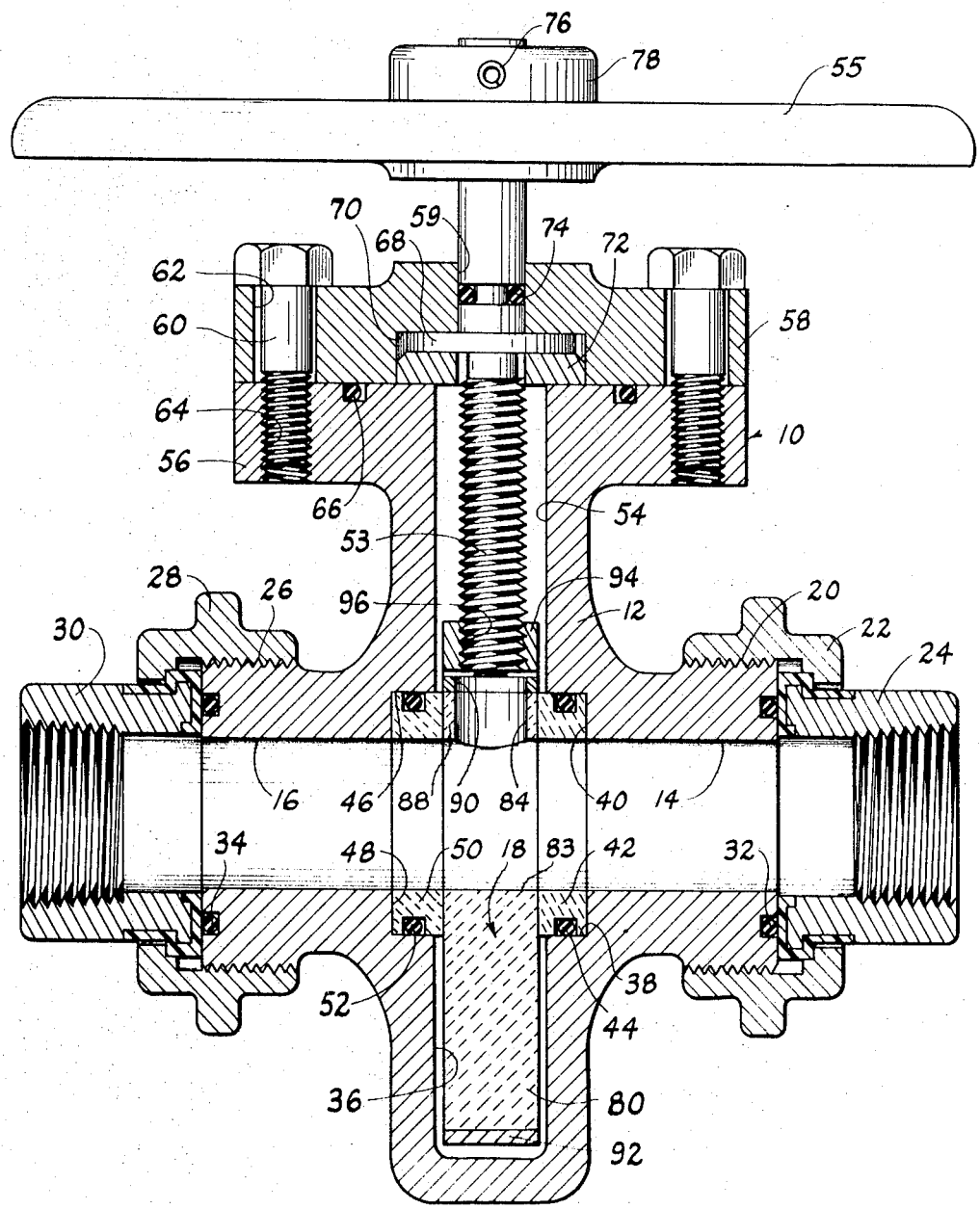
FIG. 1 is a sectional elevational view of a gate valve embodying the invention.

Referring to the drawings in detail, reference character 10 generally indicates a gate valve which may be of any suitable configuration. As particularly shown in FIG. 1, the valve 10 comprises a valve body 12 having aligned bores 14 and 16 for providing a fluid passageway through the body 12. Normally, the flow of fluid through the bores 14 and 16 is unidirectional, and a gate member, generally indicated at 18, is interposed therebetween in a manner as will be hereinafter set forth for alternately opening and closing communication between the bores 14 and 16 to provide open and closed positions for the valve 10.

The outer periphery of the bores 14 and 16 may be provided with any suitable connecting means for facilitating interposing of the valve 10 in a flow line, or the like (not shown). For example, as shown in FIG. 1, the outer periphery of the bore 14 is threaded at 20 for receiving a union nut 22 thereon, which in turn carries an internally threaded sleeve or union tail sub for connecting with the pipe section (not shown) wherein the valve 10 is to be secured to the flow line. Similarly, the outer periphery of the bore 16 is threaded at 26 for receiving a suitable union nut 28 thereon which carries an internally threaded sleeve or union tail sub 30 for connection with the pipe section (not shown) for interposing the valve 10 in the flow line, as is well known. Of course, suitable sealing members of O-rings 32 and 34 may be interposed between the body 12 and the sleeves 24 and 30, respectively, for precluding leakage of fluid therebetween.

The bores 14 and 16 are preferably of substantially equal diameters to provide a minimum of disturbance to the flow stream moving therethrough. A transversely extending recess or gate receiving chamber 36 is provided in the body 12 substantially centrally disposed between the adjacent ends of the bores 14 and 16. The gate member 18 extends into the recess 36 and is reciprocal therein for a purpose and in a manner as will be hereinafter set forth. The bore 14 is enlarged at 38 conterminous with the recess 36 to provide an annular shoulder 40 for receiving valve seating member 42 thereagainst. The seat member 42 is of an annular configuration with the inner diameter thereof substantially equal to the diameter of the bores 14 and 16, and an O-ring 44 or other suitable sealing member is disposed around the outer periphery of the seat 42 for precluding leakage of fluid therearound. The bore 16 is similarly enlarged at 46 to provide an annular shoulder 48 for receiving a valve seat member 50 thereagainst. The valve seat 50 is substantially identical to the seat 42 and a suitable sealing member or O-ring 52 is disposed around the outer periphery thereof for precluding leakage of fluid therearound.

The seat members 42 and 50 are disposed on opposite sides of the gate member 18 and are in constant engagement therewith whereby the gate member 18 facilitates retaining of the valve seats 42 and 50 in position against the shoulders 40 and 48, respectively. In addition, the seat members 42 and 50 are constructed from a suitable ceramic material having characteristics of high-compressive strength, great hardness, and high resistance to corrosion, erosion and temperature extremes, as will be hereinafter set forth in detail.

The body 12 is further provided with a transversely extending recess or gate receiving chamber 54 disposed in substantial alignment with the recess 36 and extending in an opposite direction with respect thereto. The gate member 18 extends into the recess 54 and is reciprocal therein. A threaded shank member 53 is threadedly secured to the gate member 18 in a manner as will be hereinafter set forth, and extends through the recess 54 and therebeyond into connection with a hand wheel 55, or the like, which facilitates manual rotation of the shank 53 for providing said reciprocation of the gate member 18 in the aligned recesses 36 and 54.

An outwardly extending flange 56 is provided on the body 12 at the open end of the recess 54 for receiving and supporting a suitable cover or closure member 58. The closure member 58 is provided with a centrally disposed bore 59 for receiving the shank 53 therethrough and may be removably secured to the flange 56 in any well-known manner, such as by a plurality of threaded stud members 60 which extend through bores 62 provided in the cover 58 in substantial alignment with threaded bores 64 provided in the flange 59. Of course, an O-ring 66 or other suitable sealing member may be interposed between the flange 56 and the cover 58 for precluding leakage of fluid therebetween.

The shaft 53 may be journaled in the bore 59 in any suitable manner, and is preferably journaled for rotation therein without relative longitudinal movement therebetween. For example, as shown in FIG. 1, an outwardly extending circumferential flange member 68 is provided around the outer periphery of the shaft 53 and is disposed adjacent an annular shoulder 70 provided in the cover 58 conterminous with the bore 59. A thrust washer 72 is disposed around the shank 53 and supported on the body 12 for retaining the flange 68 in position. It will be apparent that the confinement of the flange 68 between the shoulder 70 and thrust washer 72 precludes longitudinal movement of the shaft 53 while permitting free rotation about the longitudinal axis thereof. It is also preferable to interpose an O-ring 74, or the like, between the shank 53 and the bore 59 for precluding leakage of fluid therebetween.

The handle or wheel 55 may be secured to the upper end of the shank 53 in any suitable manner, such as by a pin 76 extending transversely through the shank 53 and through the hub 78 of the wheel 55, and removably secured therein by any suitable means. Thus, manual rotation of the wheel 55 transmits rotation to the shank 53 for actuation of the gate member 18 as will be hereinafter set forth.

The gate member 18 is particularly shown in FIGS. 3 and comprises a substantially slab-shaped body 80 constructed of a ceramic material similar to the ceramic material of the valve seat members 42 and 50, as will be hereinafter set forth. The body 80 is provided with opposed side edges 77 and 79 and one substantially flat edge 81 and an arcuate edge 82 oppositely disposed with respect thereto. A bore 83 is provided in the upper portion of the body 80 as viewed in the drawings, and the diameter of the bore 83 is substantially equal to the diameter of the bores 14 and 16 and the inner diameter of the valve seats 42 and 50. Thus, when the bore 83 is positioned in alignment with the bores 14 and 16 as shown in FIG. 1 the valve 10 will be in a full open position with substantially no obstruction to the flow of fluid, pipeline pigs (not shown) or the like, moving through the flow line (not shown) and valve.

A centrally disposed bore 84 extends longitudinally into the body 80 from the upper edge 81 thereof and into communication with the bore 83. A spacer bar 88 is disposed on the upper edge 81 of the body 80 and is provided with a central aperture 90 in substantial alignment with the bore 84. A substantially U-shaped pressure band 92 extends around the side edges 77 and 79 and the arcuate edge 82 and a cross bar 94 is welded or otherwise secured between the spaced ends of the strap or band 92. A centrally disposed threaded bore 96 is provided in the cross bar 94 for receiving the threaded shank 53 therein whereby rotation of the shank 53 in one direction will cause the gate 18 to move upwardly as viewed in FIG. 1 and rotation thereof in an opposite direction will cause the gate 18 to move downwardly. A plurality of threaded bores 98 are provided in the cross bar 94 spaced from the central bore 96 for receiving set screws (not shown) therein. The set screws bear against the spacer 88 and maintain the band 92 in a tight engagement around the body 80, thus keeping the ceramic material from which the body 80 is constructed in constant compression.

As hereinbefore set forth, the body 80 and valve seat members 42 and 50 are constructed from a ceramic material having characteristics of high-compressive strength, great hardness, and high resistance to erosion, corrosion and temperature extremes. For example, it is preferable that the seat members 42 and 50 and the gate body 80 be constructed from Alumina Ceramic ($Al_2O_3$), and whereas they may be constructed from the ceramic material in any suitable manner, it is preferable that they be constructed by a suitable molding process. The Alumina Ceramic material which is considered as preferable for the construction of the body 80 and seat members 42 and 50 is sold by Coors Porcelain Co. under the identification of AD85 Ceramic. This material has a compressive strength of 240,000 p.s.i., a tensile strength of 18,000 p.s.i. (comparable with the tensile strength of cast iron), a hardness of 75 (Rockwell 45N), a surface finish of 30/45 microinches, a specific gravity of 3.41, and the permeability thereof is gastight.

When the valve 10 is interposed in a flow line (not shown) or the like, the gate member 18 may be moved upwardly and downwardly by rotation of the shank 53 through the manual rotation of the wheel 55 for alternate opening and closing of the valve. When the shaft 53 is rotated in one direction the gate moves downwardly as viewed in the drawings to the position shown in FIG. 1. The bore 83 will then be positioned in alignment with the bores 14 and 16 to provide a full open position for the valve. As hereinbefore set forth, the gate body 80 is maintained in compression at all times by the pressure band 92 thus assuring great strength for the gate member. In addition, the seat members 42 and 50 are engaged by the gate body 80 at all times, thus providing a ceramic to ceramic engagement for providing an optimum friction therebetween to greatly facilitate the up and down movement of the gate member 18 with respect to the seat members.

When it is desired to close the valve 10, the shaft 53 may be rotated in an opposite direction whereby the gate member 18 will move upwardly with respect to the shank 53 and into the recess 54. The upward movement of the gate 18 will be limited either by the engagement of the cross bar 94 with the spacer 72, or by the engagement of the end of the shank 53 with the portion of the bore 83 oppositely disposed therefrom. In this uppermost position for the gate 18, the bore 83 will be moved completely away from the bores 14 and 16 will be blocked by the body 80.

The bore or port 83 of the gate member 18 is disposed in the upper portion of the body 80 in order that the forces to open the valve are applied to the body 80 by a pushing or compressive stress, which is applied through the shaft 53, block 94 and spacer or thrust washer 88. Of course, when the valve is opened the force on the body 80 through the washer or spacer 88 and strap 92 will still retain-compressive forces on the body 80.

As hereinbefore set forth, the use of ceramic to ceramic surfaces at the valve seating area produces considerably less friction and the friction very advantageously lowers as unit loading increases. For example, a two inch valve under 1,000 p.s.i. pressure conditions may require 16 foot pounds or torque to open, but in the same valve operating at 3,000 p.s.i. pressure conditions with the ceramic to ceramic surfaces to opening torque would increase only to 20 foot pounds. In a conventional metal to metal hardsurface valve, the opening forces required are normally expected to triple under the same conditions, or require 48 foot pounds of torque at 3,000 p.s.i. operating pressures. This is extremely important since at the greater torque requirements, hand or manual operation for the opening and closing of the valve becomes extremely difficult, if not impossible, and electric or power operators are expensive, and become increasingly expensive as the torque requirements increase. Furthermore, a flat torque curve $vx.$ pressure is a very desirable feature in valve design.

Referring now to FIG. 2, a modified gate valve 100 is shown which comprises a body 102 having aligned bores 104 and 106 of substantially equal diameters therein to provide a fluid passageway through the valve. The bore 104 is internally threaded at 108 for receiving one end of a pipe section (not shown), or the like, and the bore 106 is similarly internally threaded at 110 for receiving one end of an adjacent pipe section (not shown) for interposing the valve 100 in a flow line, or the like, as is well known. A gate member generally indicated at 112 is interposed between the bores 104 and 106 and reciprocally disposed within the body 102 for providing alternate open and closed positions for the valve 100. A recess or gate receiving chamber 114 similar to the recess 36 in the valve 10 is provided in the body 102 substantially centrally disposed between the bores 104 and 106 and the gate member 112 is reciprocally disposed therein.

The bore 104 is enlarged at 116 to provide an annular shoulder 118 for receiving a valve-seating member 120 therein. The valve seat 120 is of substantially annular configuration and an O-ring 122 or other sealing member is disposed in the enlarged portion 116 and around the seat 120 for precluding leakage of fluid therebetween. The bore 106 is similarly enlarged at 124 to provide an annular shoulder 126 for receiving a valve seat member 128. The valve seat 128 is substantially identical with the valve seat 120, and a suitable O-ring 130, or the like, is disposed in the enlarged portion 124 and around the seat 128 for precluding leakage of fluid therebetween. The valve seats 120 and 128 are constructed from the ceramic material as hereinbefore set forth in connection with the valve seat 42 and 50, and for the same purpose.

The body 12 is provided with a gate receiving recess 132 similar to the recess 54 in the valve 10 and oppositely disposed with respect to the recess 114. The gate 112 is reciprocal with respect to the recess 132 in a manner as will be hereinafter set forth. The body 12 is provided with an outwardly extending flange 134 at the outer end of the recess 132 for supporting a flanged sleeve or neck member 136. The sleeve 136 may be removably secured to the flange 134 in any suitable manner, such as by a plurality of spaced bolts 138 which extend through bores 140 provided in the flanged sleeve 136 in alignment with threaded bores 142 provided in the flange 134. An O-ring 135 may be interposed between the flange 134 and the sleeve 136 for precluding leakage of fluid therebetween.

A threaded shaft or shank member 144 is threadedly secured to the gate member 112 in a manner as will be hereinafter set forth, and extends through the sleeve 136 and therebeyond for receiving a suitable hand wheel 146, similar to the wheel 55 of the valve 10 and secured to the shank 144 in a similar manner. A cover member 148 is disposed on the outer or upper end of the sleeve 136 and is provided with a central bore 149 disposed around the shank 144. The cover 148 is removably secured to the sleeve 136 by a plurality of spaced threaded studs or bolts 150, as is well known. An outwardly extending circumferential flange 152 is provided on the outer periphery of the shank 144 and is disposed adjacent an annular shoulder 154 provided in the cover member 148 conterminous with the bore 149. A thrust washer 156 is disposed around the shank 144 and supported by the sleeve 136 for maintaining the flange 152 in position against the shoulder 154. Thus, rotation of the shaft 144 by manual operation of the wheel 146 will result in rotational movement only, without longitudinal movement of the shank 144 with respect to the sleeve 136. Of course, it is desirable to interpose an O-ring 158, or the like, between the shank 144 and the bore 149 for precluding leakage of fluid therebetween.

Referring now to FIG. 4, the gate member 112 comprises a body portion 160 generally similar to the body 80 and having opposed side edges 162 and 164 and one flat edge 166 and an oppositely disposed arcuate edge 168. A bore 170 is provided in the upper portion of the body 160 similar to the bore 83 and for the same purpose. Of course, the diameter of the bore 170, and the inner diameter of each of the valve seats 120 and 128 are substantially equal to the diameter of the bores 104 and 106 to provide a full open valve, as hereinbefore set forth. The body 160 is constructed from the ceramic material, as hereinbefore set forth, and a thrust washer or spacer 172 is disposed on the edge 166 of the body 160 for a purpose and in a manner as the spacer 88.

A pressure band or strap 174 similar to the band 92 extends around the side edges 162 and 164 and the arcuate edge 168 of the body 160, and a cross bar member 176 is welded or otherwise secured between the spaced ends of the strap 174. A centrally disposed sleeve or neck 178 is provided on the cross bar 176 and extends outwardly therefrom in a direction opposite from the body 160. The sleeve 178 is internally threaded at 180 for receiving the shaft 144 therein for securing the gate member 112 thereto. In addition, a plurality of threaded bores 182 are provided in the cross bar 176 spaced from the sleeve 178 for receiving set screws (not shown) or the like, therethrough. The set screws bear against the spacer or thrust washer 172 for tightly securing the band 174 around the body 160 and creating a force on the body 160 through the washer 172 thus maintaining the body 160 in compression.

When the valve 100 is interposed in a flow line (not shown) or the like, the wheel 146 may be manually rotated in one direction for transmitting rotation to the shank 144 for causing the gate member 112 to move downwardly as viewed in the drawings to the position shown in FIG. 2. In this position for the gate 112, the bore 170 will be disposed in substantial alignment with the bores 104 and 106, and the valve 100 will be in a full open position, as hereinbefore set forth. When it is desired to close the valve 100, the wheel 146 may be rotated in an opposite direction for rotating the shaft 144 in an opposite direction whereby the sleeve 178 will move upwardly with respect thereto, as viewed in the drawings. The gate member 112 will thus be moved upwardly for moving the bore 170 out of alignment with and completely away from the bores 104 and 106. The body 160 of the gate 112 will then preclude communication between the bores 104 and 106 to provide a closed position for the valve 100. Of course, the upward travel of the gate 112 will be limited either by the engagement of the sleeve 178 with the thrust washer 156 or by the engagement of the shank 144 with the spacer 172.

From the foregoing it will be apparent that the present invention provides a novel gate valve having the valve seating members and gate member thereof constructed from a corrosion and erosion resistant ceramic material of great compressive strength and high resistance to temperature extremes. The gate member is particularly constructed for maintaining the ceramic material under compression at all times, and the gate member is further constructed for utilizing opening and closing forces for increasing the compressive forces acting on the gate member. The ceramic to ceramic seating surfaces greatly reduce the frictional forces in the valve during opening and closing thereof for facilitating the opening and closing, particularly under high-operating conditions. Of course, the ceramic material may be utilized for the closure member and seating portions of any desired valve. The novel valve is simple and efficient in operation and economical and durable in construction.

Whereas the present invention has been described in particular relation to the drawings attached hereto, it should be understood that other and further modificatons, apart from those shown or suggested herein, may be made within the spirit and scope of this invention.

What is claimed is:

1. A gate valve comprising a housing having aligned bores providing a fluid passageway therethrough, a gate member reciprocally interposed between the aligned bores to provide alternate open and closed positions for the valve, valve seat means disposed in the aligned bores and on opposite sides of the gate member for engagement thereby, means extending into the housing and operably connected with the gate member for reciprocating thereof, said gate member being provided with a transverse aperture in alignment with the aligned bores in one position of the gate to provide said open position for the valve and out of alignment with the aligned bores in a second position of the gate member to provide said closed position for the valve, said gate member and valve seat means being constructed from a ceramic material, wherein the gate member comprises a slab-shaped body constructed from the ceramic material, a pressure band surrounding a portion of the body, a cross bar secured to the pressure band and spanning the body, thrust washer means interposed between the cross bar and body, and means extending through the cross bar and engageable with the thrust washer means for applying compressive force to the ceramic material of the body.

2. A gate valve as set forth in claim 1 wherein the aperture in the gate member is disposed in the upper portion thereof whereby opening and closing of the gate member applies compressive forces on the ceramic material of the gate member.

3. A gate valve as set forth in claim 1 wherein the ceramic material has characteristics including great-compressive strength and extreme hardness.

4. A gate valve comprising a housing having aligned bores providing a fluid passageway therethrough, a gate member reciprocally interposed between the aligned bores to provide alternate open and closed positions for the valve, valve seat means disposed in the aligned bores and on opposite sides of the gate member for engagement thereby, means extending into the housing and operably connected with the gate member for reciprocation thereof, said gate member being provided with a transverse aperture in alignment with the aligned bores in one position of the gate to provide said open position for the valve and out of alignment with the aligned bores in a second position of the gate member to provide said closed position for the valve, said gate member and valve seat means being constructed from a ceramic material, wherein the gate member comprises a slab-shaped body of substantially U-shaped elevational configuration and constructed from a ceramic material, a U-shaped pressure band extending around the U-shaped portion of the body, a crossbar member secured to the end of the pressure band and spanning the body, spacer means extending through the crossbar member and the body, threaded means extending through the cross bar member and into engagement with the spacer member for applying-compressive forces to the ceramic material of the body.

5. A gate valve as set forth in claim 4 wherein the ceramic material has characteristics including great compressive strength and extreme hardness.

6. A gate valve comprising a housing having aligned bores providing a fluid passageway therethrough, a gate member reciprocally interposed between the aligned bores to provide alternate open and closed positions for the valve, valve seat means disposed in the aligned bores and on opposite sides of the gate member for engagement thereby, means extending into the housing and operably connected with the gate member for reciprocation thereof, said gate member having a centrally disposed longitudinal bore extending therein for receiving said reciprocating means upon movement of said gate member toward the closed position thereof, said gate member being provided with a transverse aperture in alignment with the aligned bores in one position of the gate to provide said open position for the valve and out of alignment with the aligned bores in a second position of the gate member to provide said closed position for the valve, said gate member and valve seat means being constructed from a ceramic material wherein the aperture in the gate member is disposed in the upper portion thereof whereby opening and closing of the gate member applies compressive forces on the ceramic material of the gate member.

7. A gate valve as set forth in claim 6 wherein the ceramic material has characteristics including great-compressive strength, extreme hardness, and high resistance to temperature extremes.